United States Patent
Fax et al.

(10) Patent No.: US 7,334,474 B2
(45) Date of Patent: Feb. 26, 2008

(54) FORCE BALANCED INSTRUMENT SYSTEM AND METHOD FOR MITIGATING ERRORS

(75) Inventors: J. Alexander Fax, Los Angeles, CA (US); Robert Griffith, Newhall, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 403 days.

(21) Appl. No.: 11/031,271

(22) Filed: Jan. 7, 2005

(65) Prior Publication Data

US 2006/0150735 A1 Jul. 13, 2006

(51) Int. Cl.
G01P 15/13 (2006.01)
G01P 15/125 (2006.01)

(52) U.S. Cl. .................. 73/514.18; 73/514.32

(58) Field of Classification Search ............. 73/514.17, 73/514.18, 514.32, 514.36, 514.38, 1.37, 73/1.38, 862.61, 862.626; 361/280, 283.3
See application file for complete search history.

(56) References Cited

U.S. PATENT DOCUMENTS

| | | | |
|---|---|---|---|
| 4,345,474 A * | 8/1982 | Deval ....................... | 73/514.18 |
| 4,679,434 A | 7/1987 | Stewart | |
| 5,142,921 A | 9/1992 | Stewart et al. | |
| 5,343,766 A * | 9/1994 | Lee .......................... | 73/862.61 |
| 5,440,939 A | 8/1995 | Barny et al. | |
| 5,473,946 A * | 12/1995 | Wyse et al. ............... | 73/514.18 |
| 5,497,660 A | 3/1996 | Warren | |
| 5,503,285 A | 4/1996 | Warren | |
| 5,850,042 A | 12/1998 | Warren | |
| 5,852,242 A * | 12/1998 | Devolk et al. ............ | 73/514.17 |
| 5,939,633 A * | 8/1999 | Judy ........................ | 73/514.32 |
| 6,105,427 A | 8/2000 | Stewart et al. | |
| 6,257,061 B1 * | 7/2001 | Nonoyama et al. ...... | 73/514.32 |
| 6,294,400 B1 | 9/2001 | Stewart et al. | |
| 6,360,602 B1 | 3/2002 | Tazartes et al. | |

OTHER PUBLICATIONS

International Search Report for corresponding PCT/US2006/000004 filed Mar. 1, 2006, search completed Apr. 27, 2006 by D. Reto of the EPO, mailed Apr. 5, 2006 (copy enclosed).

* cited by examiner

Primary Examiner—Helen Kwok
(74) Attorney, Agent, or Firm—Tarolli, Sundheim, Covell & Tummino LLP (57) ABSTRACT

A force balanced instrument system and method for mitigating errors is provided. The system and method mitigate errors in measurement readings caused by charge buildup in force balanced instruments that employ charge pulses to generate an electrostatic force to null an inertial proof mass disposed between opposing electrodes. The system and method mitigate charge buildup by applying positive charge pulses alternately to each opposing electrode for a given charge cycle time period followed by negative charge pulses alternately to each opposing electrode for a second given charge cycle time period. The negative charge pulses remove any residual charge on the electrodes caused by the positive charge pulses. As a result the net residual charge left on the electrodes is reduced on the average.

29 Claims, 4 Drawing Sheets

FORCE BALANCED INSTRUMENT SYSTEM AND METHOD FOR MITIGATING ERRORS

TECHNICAL FIELD

The present invention relates to force balanced instruments and, more particularly, to a force balanced instrument system and method for mitigating errors.

BACKGROUND OF THE INVENTION

In a force balanced sensing instrument, such as an accelerometer for example, it is generally desired that the instrument output signal be proportional to the input condition to be sensed. Therefore, in many types of electrostatic and electromagnetic force balanced sensing instruments special techniques are required to obtain a linear relation between the instrument output and the sensed input. In electrostatic and electromagnetic instruments, the forces applied by the instrument forcer are not linearly related to the feedback voltage or current supplied to the forcer. Furthermore, for optimum operation of the instrument itself it is preferred that the feedback force applied by the feedback control network have a linear relation to the sensed input. Thus, special techniques have been employed for obtaining such linearity.

For example, in an electrostatic force balanced accelerometer, electrostatic forcing in a closed loop system is employed to position and obtain an output from a pendulous inertial mass or proof mass. The electrostatic forcing system employs a capacitative pickoff electrode on each side of a pendulous member that has been etched from a silicon substrate. A control pulse is employed to sequentially apply a constant amount of charge to each electrode. A variable force is applied to the inertial mass by varying the amount of time (e.g., duty cycle) the charge is left on a respective plate. The amount of time the charge is left on a respective plate is based on the displacement of the inertial mass relative to a null position.

However, the use of a constant charge applied to the plates is susceptible to charge buildup. This charge buildup leads to variations in the electrical characteristics of the accelerometer. These variations in electrical characteristics can result in measurements errors that vary across devices. The charge buildup is difficult to diagnose and model, since the charge buildup can be associated with inherent characteristics and/or manufacturing variations of a given device. Additionally, variations of temperature, aging and previous circuit conditions can affect the amount of charge buildup in the device.

SUMMARY OF THE INVENTION

In accordance with one aspect of the present invention, a force balanced instrument system is provided that employs charge pulses to null an inertial proof mass disposed between opposing electrode plates. The system comprises an inertial proof mass disposed between a first electrode plate and a second electrode plate and a switching system switchable between providing one of a positive charge pulse and a negative charge pulse to one of the first electrode plate and the second electrode plate. The system further comprises a control logic device that controls the switching of the switch system to provide positive charge pulses alternately to the first electrode plate and the second electrode plate for a first charge cycle time period and to provide negative charge pulses alternately to the first electrode plate and the second electrode plate for a second charge cycle time period.

In accordance with another aspect of the present invention, a force balanced instrument is provided that includes an inertial proof mass disposed between a first electrode plate and a second electrode plate. The instrument comprises means for providing one of positive charge pulses and negative charge, pulses, means for applying charge pulses of a selected polarity alternately to the first electrode plate and the second electrode plate, and means for controlling a charge cycle time period for applying positive charge pulses and a charge cycle time period for applying negative charge pulses by the means for applying.

In accordance with yet a further aspect of the present invention, a method is provided for mitigating error in a force balanced instrument that employs charge pulses to null an inertial proof mass disposed between a first electrode plate and a second electrode plate. The method comprises applying a charge pulse of a first polarity alternately to the first electrode plate and the second electrode plate for a first charge cycle time period, determining a first difference voltage between voltages induced by the charge pulses of the first polarity on the first electrode plate and the second electrode plate for each charge cycle sequence of the first charge cycle time period and aggregating the first difference voltage over time to set a duty cycle associated with the charge cycle sequence of the first charge cycle time period. The method further comprises switching the polarity of the charge pulse to charge pulses of a second polarity after completion of the first charge cycle time period, applying a charge pulse of the second polarity alternately to the first electrode plate and the second electrode plate for a second charge cycle time period, determining a second difference voltage between voltages induced by the charge pulses of the second polarity on the first electrode plate and the second electrode plate for each charge cycle sequence of the second charge cycle time period, and aggregating the first difference voltage over time to set a duty cycle associated with the charge cycle sequence of the first charge cycle time period.

DETAILED DESCRIPTION OF INVENTION

The present invention relates to a force balanced instrument system and method for mitigating errors. The system and method mitigate errors in measurement readings caused by charge buildup in force balanced instruments that employ charge pulses to generate an electrostatic force to null an inertial proof mass disposed between opposing electrodes. The system and method mitigate charge buildup by applying positive charge pulses to each opposing electrode for a given charge cycle time period followed by negative charge pulses to each opposing electrode for a second given charge cycle time period. The negative charge pulses remove any residual charge on the electrodes caused by the positive charge pulses. As a result the net residual charge left on the electrodes is reduced on the average.

In the present example, the term charge pulse is employed as term that provides a charge for a time duration to the electrodes of the force balanced instrument and is meant to define both a voltage pulse and a current pulse. For example, a charge pulse applied as a voltage pulse is provided as an input, which is converted to a current pulse when applied to the electrodes resulting in a charge being applied to the electrodes. Therefore, the term charge pulse is meant to indicate either of a current pulse or a voltage pulse.

It is to be appreciated that the electrostatic force (F) is a function of the charge squared ($Q^2$). Therefore, the polarity of the electrostatic force does not change with the polarity of the charge applied to the electrodes. The first and second charge cycle time periods can each be a single charge pulse sequence (i.e., single pulse to each opposing electrode) or a plurality of charge pulse sequences. Although the system and method will be illustrated with examples of an accelerometer system, it is to be appreciated that the system and method can be employed in a variety of different force balance instrument types.

A force balanced instrument, such as an accelerometer, employs a proof mass having combined electrostatic pickoff and forcing plates or electrodes on opposite sides thereof. The plates provide a constant attractive force in successive portions of a charge sequence acting alternately on opposing sides of the sensitive element. Force balance is achieved by controlling the duty cycle of the charge cycle sequence, so that the difference in duration between each of the portions of a full charge sequence is a linear measure of acceleration. Voltage on each of the forcing plates is sensed independently subsequently after each is charged with a charging pulse which provides a substantially fixed force level over the duration of the charge sequence portion. The two successive voltage samples are stored, and the difference between them integrated to control the duty cycle of the charge cycle sequence, which itself controls the duration of application of the alternately directed forces applied by the respective plates to the proof mass.

Figure 1:
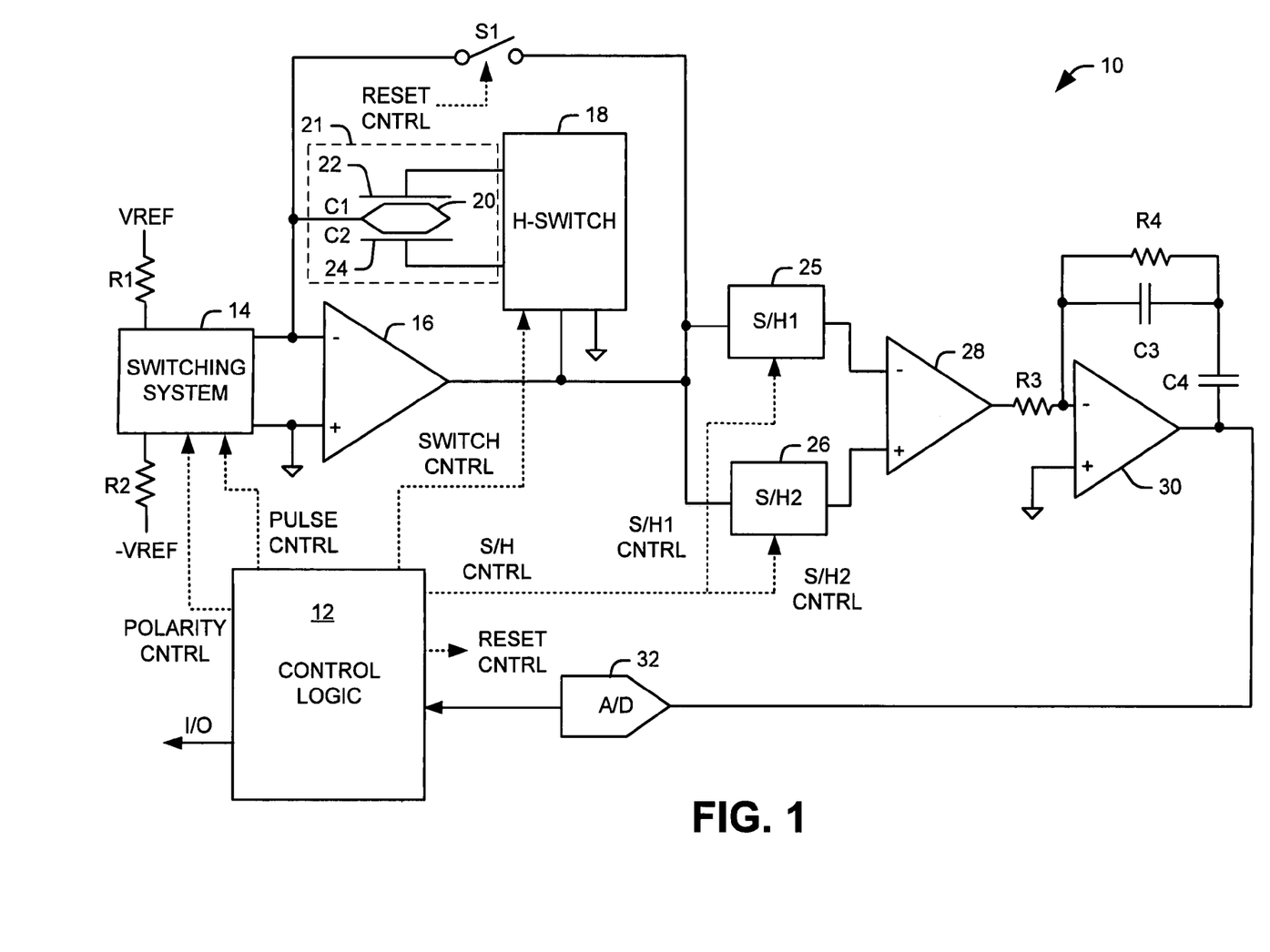
FIG. 1 illustrates a schematic diagram of an accelerometer system in accordance with an aspect of the present invention.

FIG. 1 illustrates a schematic block diagram of an exemplary accelerometer system 10 in accordance with an aspect of the present invention. Although the present example will be illustrated with respect to an accelerometer system, the present invention can be employed in a variety of other force balanced instrument system that employ charge pulses to null an inertial proof mass. The accelerometer system 10 provides one example of a technique for implementing polarity reversal and charge pulse control, but it is to be appreciated that a variety of other techniques can be employed for implementing polarity reversal and charge pulse control. The accelerometer system 10 includes a sensing element 21 comprised of a proof mass or pendulous mass 20 disposed between a top electrode plate 22 and a bottom electrode plate 24. The proof mass 20 is positioned close to but slightly spaced from the top electrode plate 22 and bottom electrode plate 24, such that a first capacitor C1 is formed from the top electrode plate 22 and the proof mass 20 and a second capacitor C2 is formed from the bottom electrode plate 24 and the proof mass 20. The sensing element 21 can be formed from a semi-conductor substrate, such that the proof mass can be anisotropically etched from the semi-conductor substrate, so that the proof mass 20 is connected to the substrate in a cantilevered arrangement.

The cantilever arrangement allows the proof mass 20 to deflect about an output axis in response to acceleration along an input axis. It is to be appreciated that one or more other elements associated with the accelerometer system 10 can be formed in the semi-conductor substrate, be stand-alone circuit devices, be integrated as an integrated circuit, or any combination of these.

The top electrode plate 22 and bottom electrode plate 24 form both pickoff and forcing plates such that a charge pulse is applied to a respective plate that causes an electrostatic force to be applied to the proof mass 20, while the voltage on the charge plate is sampled. The sampled voltage on the plate provides an indication of the displacement of the proof mass 20 relative to the sampled plate. A difference voltage between the sampled voltages on each respective electrode plate provides an indication of the displacement of the proof mass 10 relative to one plate over the other.

The accelerometer system 10 includes a switching system 14 coupled to an operational amplifier 16. A positive reference voltage (VREF) is coupled to the switching system 14 through a resistor R1 and a negative reference voltage (−VREF) is coupled to the switching system 14 through a resistor R2. A control logic device 12 generates a polarity control signal that controls which of the positive or negative reference voltage is to be employed to provide charge pulses to the top and bottom electrode plates 22 and 24. The control logic device 12 can be a hardware device (e.g., an ASIC), a processor device that employs software instructions or a combination of hardware and software devices. It is to be appreciated that the control logic device 12 can be formed from a plurality of devices for providing the appropriate control, timing, and measurement functions associated with the control logic device 12. The control logic device 12 also generates a pulse control signal. The pulse control signal couples the selected reference voltage to a negative input terminal of the operational amplifier 16 for a charge pulse time period causing a charge pulse to be applied to an input of the operational amplifier 16.

The control logic device 12 is operative to determine the number of charge cycle sequences or the charge cycle time period for applying positive charge pulses to the electrodes and the number of charge cycle sequences or the charge cycle time period for applying negative charge pulses to the electrodes. The positive charge cycle time period can be the same or different than the negative charge cycle time period. For example, a positive pulse can be applied for a single charge cycle sequence followed by a negative pulse for a single charge cycle sequence. Alternatively, a charge cycle time period can include many charge cycle sequences, such that pulses of a given polarity are applied for a charge cycle time period that is over a range in the milliseconds, seconds, minutes or hours. The alternating between positive charge pulses and negative charge pulses for charge cycle time periods can be continuous during operation of the accelerometer system 10. By alternating the polarity of the charge pulses for different charge cycle time periods, residual charge that builds up on the plates due to charge pulses of one polarity are discharged during charge pulses of an opposite polarity. Thus, errors in measurement readings are mitigated.

The control logic device 12 generates switch control signals coupled to an H-switch 18. The H-switch 18 is operative to couple the output of the operational amplifier 16 to one or the other of the top electrode plate 22 and the bottom electrode plate 24, while coupling the non-selected electrode plate to ground. It is to be appreciated that a variety of different switching devices could be employed to provide the functionality of the H-switch 18. The switch control signal determines which of the top electrode plate 22 and the bottom electrode plate 24 is to receive the charge pulse, and which of the top electrode plate 22 and the bottom electrode plate 24 is to be coupled to ground. The charge pulse will cause the voltage on the selected electrode plate to ramp up or down to a plate voltage that provides an indication of the displacement of the proof mass 20 relative to the selected plate. For example, if a positive charge pulse is applied to the selected electrode plate, the voltage will ramp up to a positive voltage relative to ground. However, if a negative charge pulse is applied to a selected electrode plate, the selected electrode plate will ramp down to a negative voltage relative to ground. A reset control signal generated by the control logic device 12 is operative to discharge the plate voltage from the selected electrode plate by coupling the electrode to ground by closing switch S1. This occurs since the negative terminal of the amplifier 16 will be driven to the potential of the positive terminal of the operational amplifier 16, which is coupled to ground.

During a charge cycle sequence, a first charge pulse is applied to the top electrode plate 22. If the first charge pulse is a positive charge pulse, the electrode plate voltage ramps up to a positive voltage relative to ground that relates to the displacement of the top electrode plate 22 relative to the proof mass 20. If the first charge pulse is a negative charge pulse, the electrode plate voltage ramps down to a negative voltage relative to ground that relates to the displacement of the top electrode plate 22 relative to the proof mass 20. The voltage on the top electrode plate 22 is sampled by a first sample and hold device 25 if the voltage is a positive voltage and a second sample and hold device 26 if the voltage is a negative voltage. The voltage on the top electrode plate 22 remains on the top electrode plate 22, until a reset pulse to switch S1 discharges the voltage from the top electrode plate 22.

A second charge pulse is applied to the bottom electrode plate 24. If the second charge pulse is a positive charge pulse, the electrode plate voltage ramps up to a positive voltage relative to ground that relates to the displacement of the bottom electrode plate 24 relative to the proof mass 20. If the second charge pulse is a negative charge pulse, the electrode plate voltage ramps down to a negative voltage relative to ground that relates to the displacement of the bottom electrode plate 24 relative to the proof mass 20. The voltage on the bottom electrode plate 24 is sampled by the second sample and hold device 26 if the voltage is a positive voltage and the first sample and hold device 25 if the voltage is a negative voltage. The voltage on the bottom electrode plate 24 remains on the bottom electrode plate 24, until a reset pulse to switch S1 discharges the voltage from the bottom electrode plate 24.

The sampled voltage on the top and bottom electrode plates 22 and 24 are provided to a differential amplifier 28. The differential amplifier 28 provides a difference signal that represents the difference between the voltage on the top electrode plate 22 and the bottom electrode plate 24. The difference signal is provided to an integrator 30 that integrates a time varying difference signal to generate an integrated difference signal. The integrator 30 is formed from resistors R3, R4, capacitors C3 and C4 and amplifier 30. The integrated difference signal is then provided to an analog to digital converter (A/D) 32, which digitizes the integrated difference signal, and provides the digitized integrated difference signal to the control logic device 12.

The integrated difference signal is employed by the control logic device 12, to adjust the amount of time charge is left on each electrode, or the duty cycle of the charge cycle sequence. The duty cycle of the charge cycle sequence is correlated with the integrated difference signal. The difference in two portions of a single charge cycle sequence or the duty cycle of the charge cycle sequence is a linear measure of acceleration. After a few charge cycle sequences, a valid acceleration value can be determined and provided to an I/O port of the control logic device 12.

It is to be appreciated that the acceleration associated with the accelerometer can vary with time, such that the above process is repeated to provide continuous updates to the acceleration values. For example, if the accelerometer executes from a 10 MegaHertz clock, and the device couple to the I/O is updated at a frequency in the Hertz or kilohertz range, a good average of acceleration readings can be derived by the control logic device 12 for each I/O update, since many charge cycle sequences would have occurred.

The control logic device 12 also generates a first sample and hold control signal (S/H1 CNTRL) for selecting the first sample and hold device 25 and a second sample and hold control signal (S/H2 CNTRL) for selecting the second sample and hold device 26. It is to be appreciated that the reversal of the plate voltages when applying negative charge pulses to the top and bottom electrode plates 22 and 24 would lead to a reversal of the sign of the input to the integrator 30 causing instability. To prevent this from occurring, the control logic device 12 determines which sample and hold device to select for sampling of the plate voltages. For example, the first sample and hold device 25 is employed for sampling the top electrode 22 and the second sample and hold device is employed for sampling the bottom electrode 24 for positive charge pulses and positive plate voltages. The second sample and hold device 25 is employed for sampling the top electrode 22 and the first sample and hold device is employed for sampling the bottom electrode 24 for negative charge pulses and negative plate voltages. By switching the sample and hold devices when the charge polarity is reversed, the unwanted sign reversal is negated. It is to be appreciated that a variety of other techniques (e.g., logic devices) can be employed to negate the unwanted sign reversal.

The control logic device 12 can also cause both sample and hold devices 25 and 26 to sample the plate voltage at the first sampling time immediately after a polarity reversal to prevent the differential amplifier 28 from seeing a positive signal out of one sample and hold device, and a negative signal out of the other sample and hold device, which would saturate the integrator 30. Instead, by having both sample and hold devices sample simultaneously, the integrator 30 sees a zero input for one half-cycle, which may induce a transient but does not induce saturation. Alternatively, the control logic device 12 can delay sampling for one charge cycle sequence to avoid sampling of positive and negative voltages at the same time.

Figure 2:
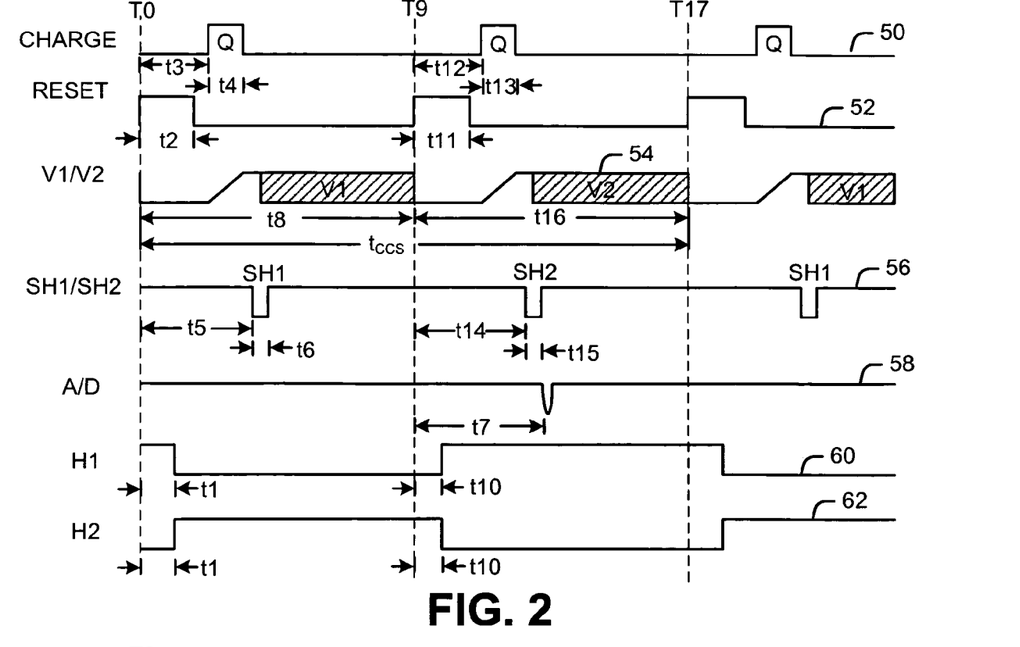
FIG. 2 illustrates a timing diagram associated with applying positive charge pulses to electrodes of the accelerometer of FIG. 1.

FIG. 2 illustrates a timing diagram associated with applying positive charge pulses to electrodes of the accelerometer system 10 of FIG. 1. The timing diagram includes a plurality of waveforms including a charge pulse waveform 50 that corresponds to a current pulse provided to an input of the amplifier 16, a reset control signal waveform 52 that corresponds to the reset control signal and a plate voltage waveform 54 that corresponds to the voltage retained at one or the other of the top electrode plate 22 and the bottom electrode plate 24 after application of a charge pulse. The waveforms also include sample and hold control signal waveform 56 that selects between sampling the plate voltage at the first sample and hold device 25 and the second sample and hold device 26. An A/D sample waveform 58 illustrates sampling of the integrated difference signal by the A/D converter 32. Additionally, a first H switch waveform 60 is provided that illustrates switching of the output of the amplifier 16 to and from the top electrode plate 22 and a second H switch waveform 62 that illustrates switching of the output of the amplifier 16 to and from the bottom electrode plate 24.

In the timing diagram of FIG. 2 an upper case "T" is employed to represent an instance in time, while a lower case "t" is employed to represent a time interval. As illustrated in FIG. 2, at a time T0 a reset control signal is applied to switch S1 causing the bottom electrode plate 24 to discharge any voltage residing on the bottom electrode plate 24 from a previous charge cycle sequence. At an end of a time interval t1 (e.g., 5.38 ms), the first H switch waveform 60 goes low, while the second H switch waveform 62 goes high causing the bottom electrode plate 24 to be disconnected from the output of the amplifier 16 and the top electrode plate 22 to be connected to the output of the amplifier 16. At an end of a time interval t2 (e.g., 5.38 ms), the reset waveform 52 transitions low causing the switch S1 to open and disconnecting ground from the selected top electrode plate 22. At an end of a time interval t3, slightly after the reset waveform 52 transitions low, a positive charge pulse (Q) is applied to the top electrode plate 22 for a charge pulse period t4 (e.g., 4.89 ms) as illustrated in the charge pulse waveform 50. The positive charge pulse (Q) is applied by the pulse control signal and polarity select signal coupling the positive reference voltage VREF to the negative terminal of the operational amplifier 16 via the switching system 14. This results in a positive charge pulse at the input of the amplifier 16 and at the top electrode plate 22.

As illustrated in the plate voltage waveform 54, the plate voltage on the top electrode plate 22 ramps up to a positive voltage level V1 that is associated with the displacement of the proof mass 20 relative to the top electrode plate 22. At an end of a time interval t5 just after the plate voltage ramps to voltage level V1, the first sample and hold circuit 25 samples the voltage on the top electrode plate 22 for a sample time interval t6, as illustrated in sample and hold control signal waveform 56. The plate voltage remains on the top electrode plate 22, until an end of a time interval t8. The time interval t8 represents a first portion of a time interval $t_{CCS}$ of a charge cycle sequence. A constant electrostatic force is applied to the proof mass 20 during the time the voltage V1 remains on the top electrode plate 22.

At time T9, a reset signal is applied to switch S1 causing the top electrode to discharge voltage V1 residing on the top electrode plate 22 from the first portion of the charge cycle sequence. At an end of a time interval t10 from time T9, the second H switch waveform 62 goes low, while the first H switch waveform 60 goes high causing the top electrode plate 22 to be disconnected from the output of the amplifier 16 and the bottom electrode plate 24 to be connected to the output of the amplifier 16. At an end of a time interval t11 from T9, the reset waveform 52 transitions low causing the switch S1 to open and disconnecting ground from the selected bottom electrode plate 24. At an end of a time interval t12 from time T9, slightly after the reset waveform 52 transitions low, a positive charge pulse (Q) is applied to the bottom electrode plate 24 for a charge pulse period t13 (e.g., 4.89 ms), as illustrated in the charge pulse waveform 50. The positive charge pulse (Q) is applied by the pulse control signal and polarity select signal coupling the positive reference voltage VREF to the negative terminal of the operational amplifier 16. This results in a positive charge pulse at the input of the amplifier 16 and at the bottom electrode plate 24.

As illustrated in the plate voltage waveform 54, the plate voltage of the bottom electrode plate 24 ramps up to a positive voltage level V2 that is associated with the displacement of the proof mass 20 relative to the bottom electrode plate 24. At an end of a time interval t14 from time T9, just after the plate voltage ramps to voltage level V2, the second sample and hold circuit 26 samples the voltage on the bottom electrode plate 24 for a sample time interval t15, as illustrated in sample and hold control signal waveform 56. At an end of a time interval t7 from time T9, slightly after an end of the sample time interval T15, the A/D converter 32 samples a difference signal provided by the integrator 30, as illustrated in the A/D sample waveform 58. The integrator 30 receives the difference signal from the differential amplifier 28 that provides a difference voltage of the top electrode plate voltage V1 of the first sample and hold device 25 and the bottom electrode plate voltage V1 from the second sample and hold device 26. The plate voltage V2 remains on the bottom electrode plate 24, until an end of a time interval t16 from time T9. The time interval t16 represents a second portion of the time interval $t_{CCS}$ of the charge cycle sequence. A constant electrostatic force is applied to the proof mass 20 during the time the voltage V2 remains on the bottom electrode plate 24, until a time T17 in which the next reset pulse is applied to the bottom electrode 24. The time interval $t_{CCS}$ of the charge cycle sequence remains constant, while the time interval t8 and t16 vary based on the forces required to null the proofmass between the top and bottom electrodes. The ratio of the time interval t8 of the first portion of the charge cycle sequence to the time interval $t_{CCS}$ of the charge cycle sequence (i.e., sum of the time interval t8 and t16) represents the duty cycle of the charge cycle sequence. The duty cycle of the charge cycle sequence can be employed to derive the acceleration experienced by the proof mass 20.

Figure 3:
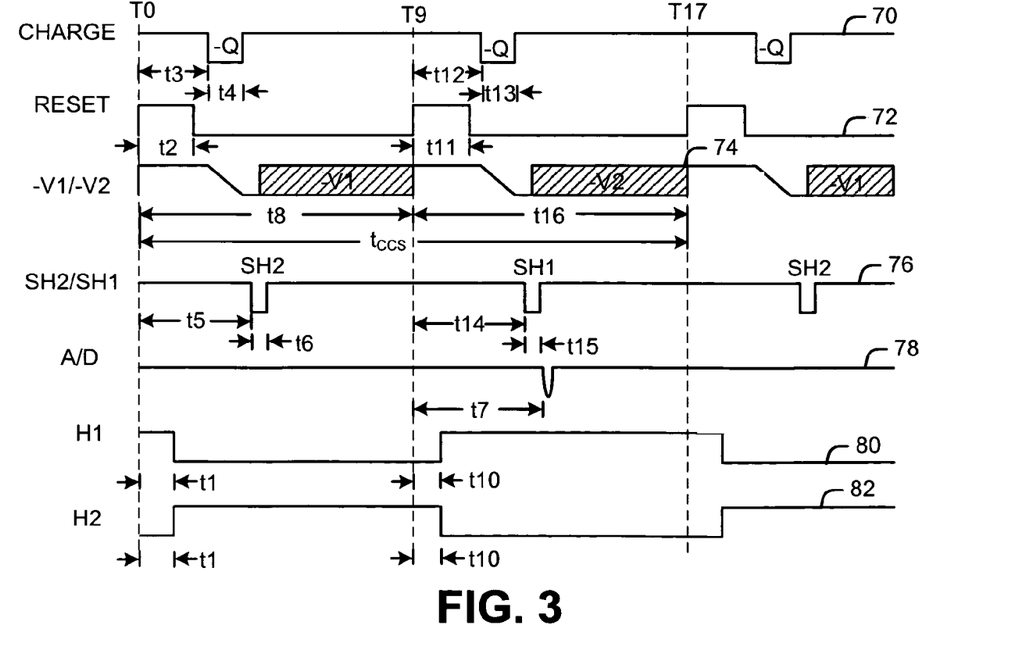
FIG. 3 illustrates a timing diagram associated with applying negative charge pulses to electrodes of the accelerometer of FIG. 1.

FIG. 3 illustrates a timing diagram associated with applying negative charge pulses to electrodes of the accelerometer system 10 of FIG. 1. The timing diagram includes a plurality of waveforms including a charge pulse waveform 70 that corresponds to a current pulse provided to an input of the amplifier 16, a reset control signal waveform 72 that corresponds to the reset control signal and a plate voltage waveform 74 that corresponds to the voltage retained at one or the other of the top electrode plate 22 and the bottom electrode plate 24 after application of a negative charge pulse. The waveforms also include sample and hold control signal waveform 76 that selects between sampling the plate voltage at the first sample and hold device 25 and the second sample and hold device 26. An A/D sample waveform 78 illustrates sampling of the integrated difference signal by the A/D converter 32. Additionally, a first H switch waveform 80 is provided that illustrates switching of the output of the amplifier 16 to and from the top electrode plate 22 and a second H switch waveform 82 that illustrates switching of the output of the amplifier 16 to and from the bottom electrode plate 24.

In the timing diagram of FIG. 3 an upper case "T" is employed to represent an instance in time, while a lower case "t" is employed to represent a time interval. As illustrated in FIG. 3, at time T0 a reset signal is applied to switch S1 causing the bottom electrode plate 24 to discharge any voltage residing on the bottom electrode from a previous charge cycle sequence. At an end of a time interval t1, the first H switch waveform 80 goes low, while the second H switch waveform 82 goes high causing the bottom electrode plate 24 to be disconnected from the output of the amplifier 16 and the top electrode plate 22 to be connected to the output of the amplifier 16. At an end of a time interval t2, the reset waveform 72 transitions low causing the switch S1 to open and disconnecting ground from the selected top electrode plate 22. At an end of a time interval t3, slightly after the reset waveform 72 transitions low, a negative charge pulse (−Q) is applied to the top electrode plate 22 for a charge pulse period t4, as illustrated in the charge pulse waveform 70. The negative charge pulse (−Q) is applied by the pulse control signal and polarity select signal coupling the negative reference voltage VREF to the negative terminal of the operational amplifier 16. This results in a negative charge pulse at the input of the amplifier 16 and at the top electrode plate 22.

As illustrated in the plate voltage waveform 74, the plate voltage on the top electrode plate 22 ramps down to a negative voltage level −V1 that is associated with the displacement of the proof mass 20 relative to the top electrode plate 22. At an end of a time interval t5 just after the plate voltage ramps down to voltage level −V1, the second sample and hold circuit 26 samples the voltage on the top electrode plate 22 for a sample time interval t6, as illustrated in the sample and hold control signal waveform 76.

The control logic device 12 switches selection of which sample and hold device to employ for which electrode based on the polarity of the charge pulse being applied to the top and bottom electrode plates. By switching the sample and hold devices when the charge polarity is reversed, the unwanted sign reversal is negated. For example, for positive charge pulses, the first sample and hold device 25 samples the top electrode plate 22 and the second sample and hold device 26 samples the bottom electrode plate 24. However, for negative charge pulses, the second sample and hold device 26 samples the top electrode plate 22 and the first sample and hold device 24 samples the bottom electrode plate 24. It is to be appreciated that a variety of other techniques can be employed for negating unwanted sign reversal.

The plate voltage −V1 remains on the top electrode plate 22 until an end of a time interval t8. The time interval t8 represents a first portion of a time interval $t_{CCS}$ of a charge cycle sequence. A constant electrostatic force is applied to the proof mass 20 during the time the voltage remains on the top electrode plate 22. At time T9, a reset signal is applied to switch S1 causing the top electrode plate 22 to discharge voltage −V1 residing on the top electrode plate 22 from the first portion of the charge cycle sequence. At an end of a time interval t10 from time T9, the second H switch waveform 82 goes low, while the first H switch waveform 80 goes high causing the top electrode plate 22 to be disconnected from the output of the amplifier 16 and the bottom electrode plate 24 to be connected to the output of the amplifier 16. At an end of a time interval t11 from time T9, the reset waveform 72 transitions low causing the switch S1 to open and disconnecting ground from the selected bottom electrode plate 24. At an end of a time interval t12 from time T9, slightly after the reset waveform 72 transitions low, a negative charge pulse (−Q) is applied to the bottom electrode plate 24 for a charge pulse period t13 (e.g., 4.89 ms), as illustrated in the charge pulse waveform 70. The negative charge pulse (−Q) is applied by the pulse control signal and polarity select signal coupling the negative reference voltage −VREF to the negative terminal of the operational amplifier 16. This results in a negative charge pulse at the input of the amplifier 16 at the bottom electrode plate 24.

As illustrated in the plate voltage waveform 74, the plate voltage of the bottom electrode plate 24 ramps down to a negative voltage level −V2 that is associated with the displacement of the proof mass 20 relative to the bottom electrode plate 24. At an end of a time interval t14 from time T9, just after the plate voltage ramps down to voltage level −V2, the first sample and hold circuit 25 samples the voltage on the bottom electrode plate 24 for a sample time interval t15, as illustrated in sample and hold control signal waveform 76. At an end of a time interval t7 from time T9, slightly after an end of the sample time interval T15, the A/D converter 32 samples a difference signal provided by the integrator 30, as illustrated in the A/D sample waveform 78. The integrator 30 receives the difference signal from the differential amplifier 28 that provides a difference voltage of the top electrode plate voltage −V1 of the second sample and hold device 26 and the bottom electrode plate voltage −V2 from the first sample and hold device 25. The plate voltage −V2 remains on the bottom electrode plate 24, until an end of a time interval t16 from time T9. The time interval t16 represents a second portion of the time interval $t_{CCS}$ of the charge cycle sequence. A constant electrostatic force is applied to the proof mass 20 during the time the voltage −V2 remains on the bottom electrode plate 24, until a time T17 in which the next reset pulse is applied to the bottom electrode 24. The time interval $t_{CCS}$ of the charge cycle sequence remains constant, while the time interval t8 and t16 vary based on the forces required to null the proofmass between the top and bottom electrodes. The ratio of the time interval t8 of the first portion of the charge cycle sequence to the time interval $t_{CCS}$ of the charge cycle sequence (i.e., sum of the time interval t8 and t16) represents the duty cycle of the charge cycle sequence. The duty cycle of the charge cycle sequence can be employed to derive the acceleration experienced by the proof mass 20.

Figure 4:
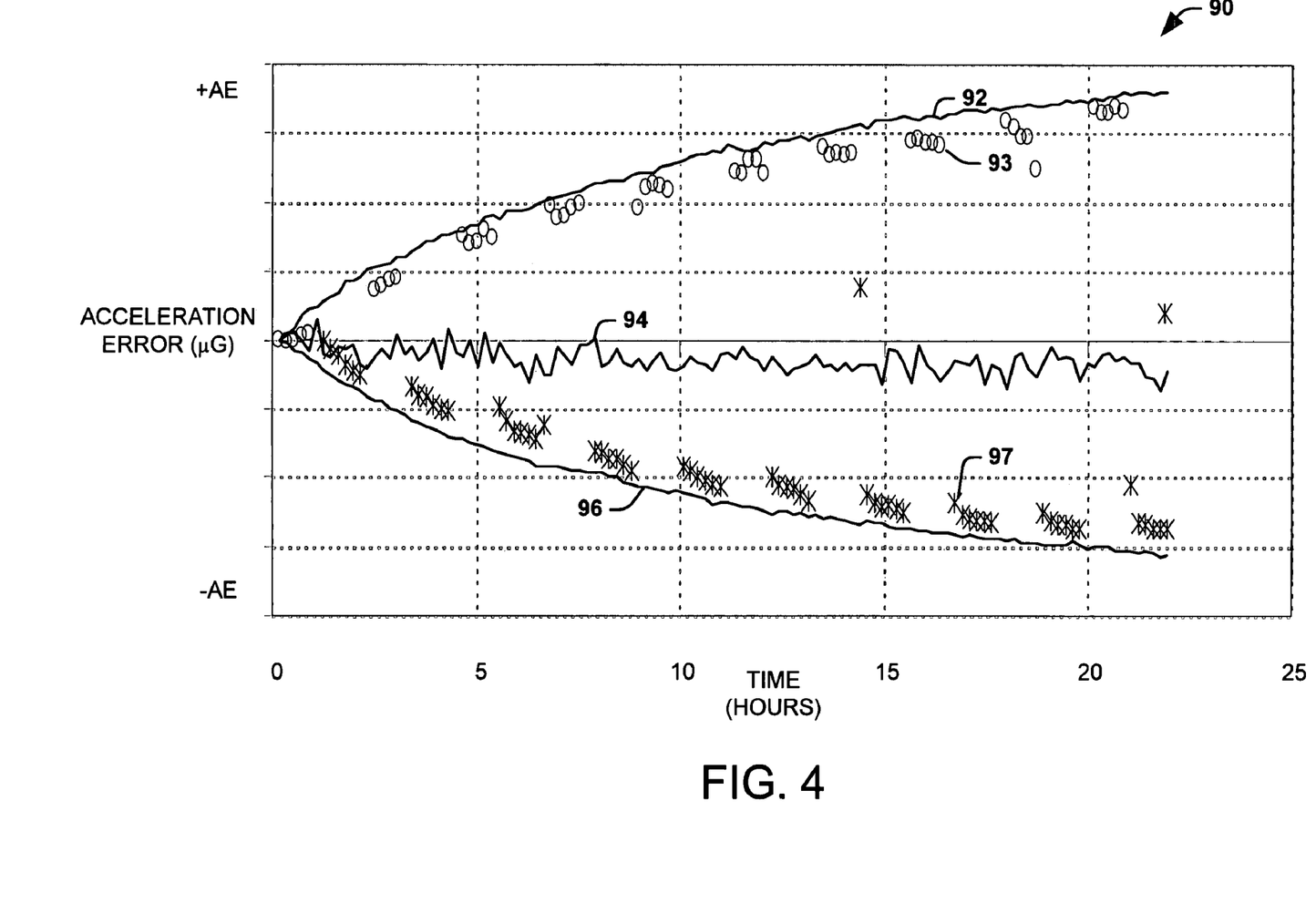
FIG. 4 illustrates a graph of acceleration ($\mu G$) error versus time (hours) of an accelerometer system that employs charge pulses to null an inertial proof mass.

FIG. 4 illustrates a graph 90 of acceleration (μG) error versus time (hours) of an accelerometer. A first line 92 illustrates a positive increase of acceleration error over time when a positive charge pulse is continuously applied to the top and bottom electrodes, while a second line 96 illustrates a negative increase of acceleration error over time when a negative charge pulse is continuously applied to the top and bottom electrodes. Both the first line 92 and second line 96 illustrate equal and opposite acceleration error over time when held at room temperature after a standard double wide temperature cycle. A third line 94 illustrates the acceleration error when the polarity is reversed rapidly, for example every 100 hertz. As illustrated in the third line 94, the acceleration error is reduced by about 90%. The O's 93 and the X's 97 illustrate when the polarity is slowly reversed. In this case, it can be seen that the acceleration error builds up, but that the sign of the effect is dependent on the sign of the charge. Thus, by rapidly reversing the polarity of the charge as illustrated in the third line 94, the charge build up averages out and becomes negligible.

Figure 5:
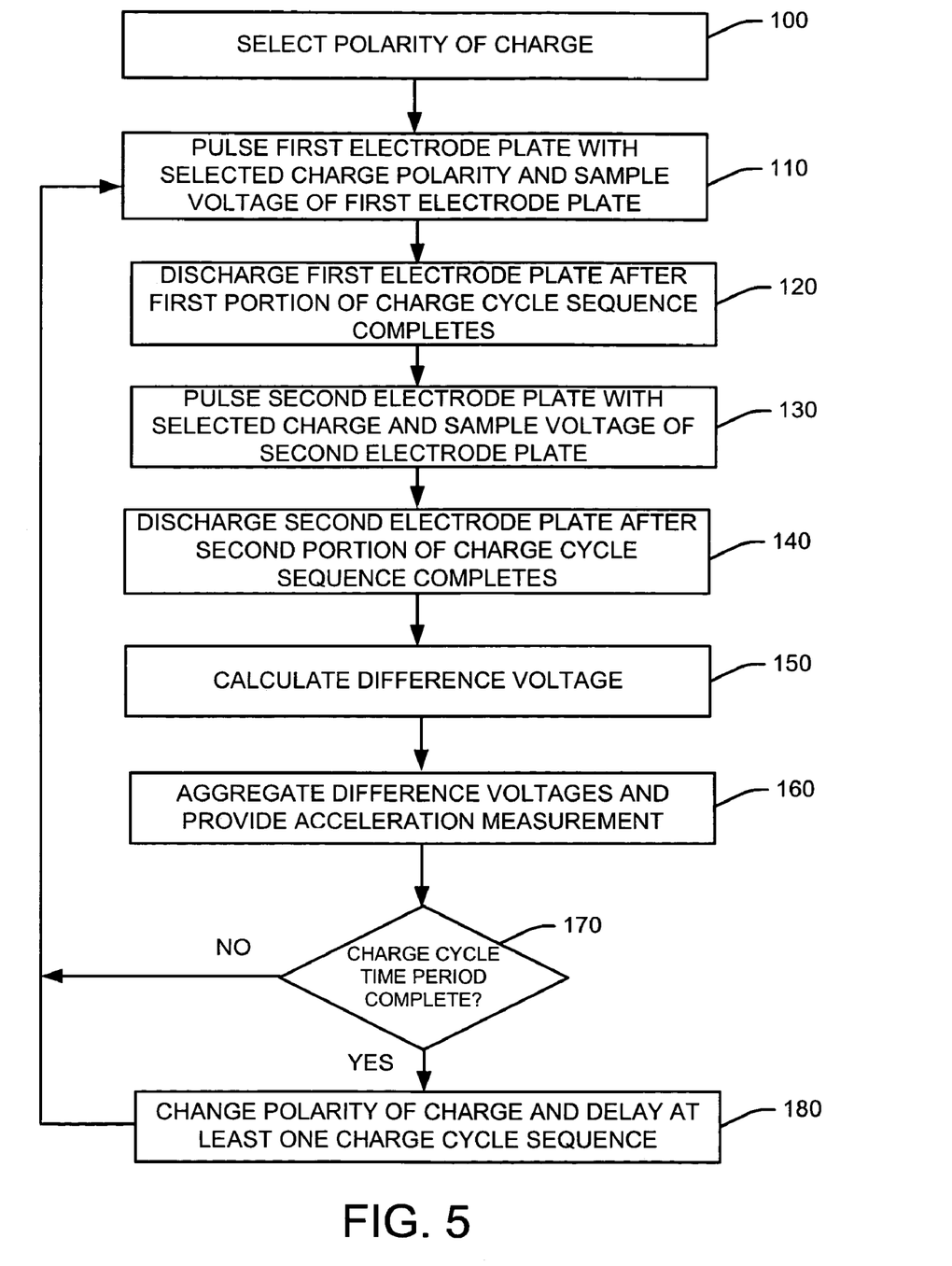
FIG. 5 illustrates a methodology for mitigating error in force balanced instruments in accordance with an aspect of the present invention.

In view of the foregoing structural and functional features described above, methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates a methodology for mitigating errors in a force balanced instrument, such as an accelerometer. The force balanced instrument includes a proof mass disposed between opposing first and second electrode plates. The methodology begins at 100 where a polarity of charge is selected. The polarity of charge can begin with a positive charge or the polarity of charge can begin with a negative charge. At 110, a first electrode plate (e.g., a top electrode) is pulsed with the selected charge polarity and the voltage of the first electrode plate is sampled slightly after the first electrode plate has achieved a voltage level associated with the displacement of the first electrode plate relative to a proof mass. At 120, the first electrode plate is discharged after a first portion of charge cycle sequence completes. The methodology then proceeds to 130.

At 130, a second electrode plate (e.g., a bottom electrode) is pulsed with the selected charge polarity and the voltage of the second electrode plate is sampled slightly after the second electrode plate has achieved a voltage level associated with the displacement of the second electrode plate relative to the proof mass. At 140, the second electrode plate is discharged after a second portion of the charge cycle sequence completes. The methodology then proceeds to 150. At 150, a difference voltage of the first and second electrode plates is calculated that provides an indication of the displacement of the proof mass relative to the first and second electrode plates. The methodology then proceeds to 160 to aggregate the calculated difference voltage over time to set a duty cycle that provides a good indication of the acceleration experienced by the proof mass. The aggregated difference voltage is employed to adjust the duty cycle of the charge cycle sequence to determine the time intervals of the first and second portions of the charge cycle sequence. This provides an indication of the force necessary to null the proof mass and can be employed to determine acceleration of the proof mass. The methodology then proceeds to 170.

At 170, the methodology determines if the charge cycle time period has completed. For example, a charge cycle time period can be a single charge cycle sequence. Alternatively, a charge cycle time period can include a plurality of charge cycle sequences. If the charge cycle time period has not completed (NO), the methodology returns to 110 to continue providing charge pulses of the selected polarity to the first and second electrodes. If the charge cycle time period has completed (YES), the methodology proceeds to 180. At 180, the selected polarity is changed from either positive to negative or negative to positive. Additionally, sampling of the electrode plates is delayed at least one charge cycle sequence so that a large difference voltage is not calculated inadvertently. Alternatively, the sample and hold device can both sample a selected plate and the charge cycle sequence delayed one half cycle. The methodology then returns to 110 to provide charge pulses with the changed polarity, until the next charge cycle time period completes.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A force balanced instrument system that employs charge pulses to null an inertial proof mass disposed between opposing electrode plates, the system comprising:
   an inertial proof mass disposed between a first electrode plate and a second electrode plate;
   a switching system switchable between providing one of a positive charge pulse and a negative charge pulse to one of the first electrode plate and the second electrode plate; and
   a control logic device that controls the switching of the switch system to provide positive charge pulses alternately to the first electrode plate and the second electrode plate for a first charge cycle time period and to provide negative charge pulses alternately to the first electrode plate and the second electrode plate for a second charge cycle time period.

2. The system of claim 1, wherein the first charge cycle time period is one charge cycle sequence and the second charge cycle time period is one charge cycle sequence.

3. The system of claim 1, wherein the first charge cycle time period is a plurality of charge cycle sequences and the second charge cycle time period is a plurality of charge cycle sequences.

4. The system of claim 1, wherein the switching system is coupled to a positive reference voltage for providing positive charge pulses and a negative reference voltage for providing negative charge pulses.

5. The system of claim 1, further comprising an operational amplifier that receives a charge pulse from a first portion of the switching system and provides the charge pulse to a second portion of the switching system that selects between providing the charge pulse to one of the top electrode plate and the bottom electrode plate.

6. The system of claim 1, wherein the first electrode plate charges to a voltage indicative of the displacement of the first electrode plate to the proof mass in response to a charge pulse and the second electrode plate charges to a voltage indicative of the displacement of the proof mass to the second electrode plate in response to a charge pulse.

7. The system of claim 6, further comprising:
   a first sample and hold device;
   a second sample and hold device;
   a difference amplifier that provides a difference voltage based on a first voltage sampled by the first sample and hold device and a second voltage sampled by the second sample and hold device; and
   wherein the first sample and hold device samples the voltage on the first electrode plate and the second sample and hold device samples the voltage on the second electrode plate during application of positive charge pulses and the second sample and hold device samples the voltage on the first electrode plate and the first sample and hold device samples the voltage on the second electrode plate during application of negative charge pulses to mitigate unwanted sign reversal of an output of the difference amplifier.

8. The system of claim 7, wherein the first sample and hold device and the second sample and hold device sample one of the first electrode plate and the second electrode plate for a first charge cycle sequence after a polarity change between applying one of positive charge Pulses and negative charge pulses to provide a zero output from the difference amplifier for one half-cycle charge cycle sequence.

9. The system of claim 7, wherein the first sample and hold device and the second sample and hold device are disabled for a first charge cycle sequence after a polarity change between applying one of positive charge pulses and negative charge pulses.

10. The system of claim 7, further comprising:
integrator that integrates difference voltages provided by the difference amplifier; and
an analog-to-digital converter that digitizes the integrated difference voltages and provides the digitized integrated difference voltages to the control logic device, the control logic device controlling the duty cycle of charge cycle sequences based on the digitized integrated difference voltages.

11. The system of claim 10, wherein the controlling the duty cycle of charge cycle sequences comprises controlling the amount of time that voltage is retained on the first electrode plate and the amount of time that voltage is retained on the second electrode plate.

12. The system of claim 1, wherein a plurality of positive charge pulses are provided alternately to the first electrode plate and the second electrode plate and a plurality of negative charge pulses are provided alternately to the first electrode plate and the second electrode plate.

13. A force balanced instrument having an inertial proof mass disposed between a first electrode plate and a second electrode plate, the instrument comprising;
means for providing one of positive charge pulses and negative charge pulses;
means for applying charge pulses of a selected polarity alternately to the first electrode plate and the second electrode plate; and
means for controlling a charge cycle time period for applying positive charge pulses and a charge cycle time period for applying negative charge pulses by the means for applying.

14. The instrument of claim 13, wherein a charge cycle time period is one of a single charge cycle sequence and a plurality of charge cycle sequences.

15. The instrument of claim 13, further comprising:
a first means for sampling a first voltage on an electrode plate induced by a charge pulse;
a second means for sampling a second voltage on an electrode plate induced by a charge pulse;
means for generating a difference voltage associated with the difference between the first voltage and the second voltage; and
means for controlling an amount of time a charge is retained on the first electrode plate and the amount of time a charge is retained on the second electrode plate based on the difference voltage.

16. The instrument of claim 15, wherein the first means for sampling a first voltage samples a voltage induced on the first electrode plate for positive charge pulses and samples a voltage induced on the second electrode plate for negative charge pulses, and the second means for sampling a second voltage samples a voltage induced on the second electrode plate for positive charge pulses and samples a voltage induced on the first electrode plate for negative charge pulses.

17. The instrument of claim 15, wherein the first means for sampling a first voltage and the second means for sampling a second voltage both sample one of the first electrode plate and the second electrode plate for a first charge cycle sequence after a polarity change between applying one of positive charge pulses and negative charge pulses to provide a zero output from the means for generating a difference voltage for one half-cycle charge cycle sequence.

18. The instrument of claim 15, wherein the first means for sampling a first voltage and the second means for sampling a second voltage are disabled for a first charge cycle sequence after a polarity change between applying one of positive charge pulses and negative charge pulses.

19. The instrument of claim 15, wherein the means for applying charge pulses of a selected polarity to the first electrode plate and the second electrode plate applies a plurality of charge pulses alternately to the first electrode plate and the second electrode plate.

20. A method for mitigating error in a force balanced instrument that employs charge pulses to null an inertial proof mass disposed between a first electrode plate and a second electrode plate, the method comprising:
applying a charge pulse of a first polarity alternately to the first electrode plate and the second electrode plate for a first charge cycle time period;
determining a first difference voltage between voltages induced by the charge pulses of the first polarity on the first electrode plate and the second electrode plate for each charge cycle sequence of the first charge cycle time period;
aggregating the first difference voltage over time to set a duty cycle associated with the charge cycle sequence of the first charge cycle time period;
switching the first polarity of the charge pulse to charge pulses of a second polarity after completion of the first charge cycle time period;
applying a charge pulse of the second polarity alternately to the first electrode plate and the second electrode plate for a second charge cycle time period;
determining a second difference voltage between voltages induced by the charge pulses of the second polarity on the first electrode plate and the second electrode plate for each charge cycle sequence of the second charge cycle time period; and
aggregating the second difference voltage over time to set a duty cycle associated with the charge cycle sequence of the second charge cycle time period.

21. The method of claim 20, wherein the first charge cycle time period is one charge cycle sequence and the second charge cycle time period is one charge cycle sequence.

22. The method of claim 20, wherein the first charge cycle time period is a plurality of charge cycle sequences and the second charge cycle time period is a plurality of charge cycle sequences.

23. The method of claim 20, wherein the charge pulses of the first polarity are positive charge pulses and the charge pulses of the second polarity are negative charge pulses.

24. The method of claim 20, further comprising determining a measure of force for nulling the proof mass between the first electrode plate and the second electrode plate based on at least one of the set duty cycle associated with the first charge cycle time period and the second charge cycle time period.

25. The method of claim 20, further comprising delaying at least one half charge cycle sequence after switching the polarity of the charge pulses to the second polarity.

26. The method of claim 20, wherein the determining a difference voltage between voltage induced by the charge pulses of the first polarity comprises:
sampling a first voltage induced on the first electrode plate;
sampling a second voltage induced on the second electrode plate; and
subtracting the second voltage from the first voltage.

27. The method of claim 26, wherein the determining a difference voltage between voltage induced by the charge pulses of the second polarity comprises:
- sampling a first voltage induced on the first electrode plate;
- sampling a second voltage induced on the second electrode plate; and subtracting the first voltage from the second voltage.

28. The system of claim 1, wherein the control logic device sequentially alternates between the first charge cycle time period and the second charge cycle time period.

29. The instrument of claim 13, wherein the charge cycle time period for applying positive pulses is a first charge cycle time period and the charge cycle time period for applying negative pulses is a second charge cycle time period, and wherein the means for controlling comprises means for sequentially alternating between the first charge cycle time period and the second charge cycle time period.

* * * * *